(12) United States Patent
Demmeler et al.

(10) Patent No.: US 11,427,361 B2
(45) Date of Patent: Aug. 30, 2022

(54) DEVICE AND METHOD FOR FILLING CONTAINERS WITH VALUE DOCUMENTS, IN PARTICULAR BANKNOTES, AND SYSTEM FOR PROCESSING VALUE DOCUMENTS

(71) Applicant: GIESECKE+DEVRIENT CURRENCY TECHNOLOGY GMBH, Munich (DE)

(72) Inventors: Erwin Demmeler, Memmingen (DE); Thomas Hildebrandt, Pliening (DE); Andreas Jakobs, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 16/628,103

(22) PCT Filed: Jun. 29, 2018

(86) PCT No.: PCT/EP2018/000331
§ 371 (c)(1),
(2) Date: Jan. 2, 2020

(87) PCT Pub. No.: WO2019/007543
PCT Pub. Date: Jan. 10, 2019

(65) Prior Publication Data
US 2020/0140129 A1 May 7, 2020

(30) Foreign Application Priority Data

Jul. 3, 2017 (DE) .................... 10 2017 006 281.1

(51) Int. Cl.
*B65B 25/14* (2006.01)
*G07D 11/00* (2019.01)
(Continued)

(52) U.S. Cl.
CPC ............ *B65B 25/141* (2013.01); *B65B 5/068* (2013.01); *B65B 7/28* (2013.01); *B65G 59/062* (2013.01);
(Continued)

(58) Field of Classification Search
CPC ......... B65B 25/141; B65B 5/068; B65B 7/28; B65B 7/2807; B65B 7/2842; G07D 11/16;
(Continued)

(56) References Cited

U.S. PATENT DOCUMENTS 2,341,126 A * 2/1944 Stover ...................... B67B 3/02
221/297
2,595,849 A 5/1952 Hammond
(Continued)

FOREIGN PATENT DOCUMENTS

CN 101821784 A 9/2010
CN 104138772 A 11/2014
(Continued)

OTHER PUBLICATIONS

International Search Report and Written Opinion from PCT Application No. PCT/EP2018/000331, dated Oct. 19, 2018.
(Continued)

*Primary Examiner* — Gregory W Adams
(74) *Attorney, Agent, or Firm* — Workman Nydegger (57) ABSTRACT

An apparatus and method for filling containers with value documents and to a system for processing value documents, wherein the apparatus has: a container receiving device which is adapted to receive a container stack having two or several containers for receiving value documents, a lid receiving device which is adapted to receive a lid stack having two or several lids for closing the containers, a container removal device which is adapted to remove,
(Continued)

preferably, the respectively lowermost container from the container stack, a closing device and a transport device which is adapted to convey the container removed from the container stack to a filling station, in which the container can be filled with value documents, and to convey the container filled with value documents to the closing device which is adapted to remove a lid from the lid stack and close the filled container with the removed lid.

20 Claims, 4 Drawing Sheets

(51) Int. Cl.
| | | |
|---|---|---|
| *G07D 11/16* | (2019.01) | |
| *B65B 5/06* | (2006.01) | |
| *B65B 7/28* | (2006.01) | |
| *B65G 59/06* | (2006.01) | |
| *B65G 60/00* | (2006.01) | |
| *B65H 31/30* | (2006.01) | |

(52) U.S. Cl.
CPC ......... *B65G 60/00* (2013.01); *B65H 31/3036* (2013.01); *G07D 11/00* (2013.01); *G07D 11/16* (2019.01); *B65H 2301/422548* (2013.01); *B65H 2701/1912* (2013.01)

(58) Field of Classification Search
CPC ...... G07D 11/00; B65G 59/062; B65G 60/00; B65H 31/3036; B65H 2301/422548; B65H 2701/1912; B65H 31/3063; B65H 31/3081; B65H 31/32
USPC ........................ 414/789.9, 790.3, 790.7, 799
See application file for complete search history.

(56) References Cited

U.S. PATENT DOCUMENTS

| | | | | |
|---|---|---|---|---|
| 2,996,859 A | * | 8/1961 | Winkler | B65B 25/141 |
| | | | | 53/529 |
| 3,895,477 A | * | 7/1975 | Yamashita | B65G 59/062 |
| | | | | 414/788.7 |
| 4,896,480 A | | 1/1990 | Blümle | |
| 5,083,411 A | * | 1/1992 | Axmann | B65G 60/00 |
| | | | | 414/788.7 |
| 6,058,684 A | * | 5/2000 | Suokas | B65B 11/004 |
| | | | | 53/529 |
| 6,152,683 A | * | 11/2000 | Linder | B65B 25/141 |
| | | | | 414/788.2 |
| 7,325,667 B1 | * | 2/2008 | Damick | B65G 59/02 |
| | | | | 198/395 |
| 8,066,469 B2 | * | 11/2011 | Trejo | B65G 57/302 |
| | | | | 414/795.2 |
| 9,754,435 B2 | | 9/2017 | Razzaboni et al. | |
| 9,928,678 B2 | | 3/2018 | Dopfer et al. | |
| 9,934,643 B2 | | 4/2018 | Neuhauser et al. | |
| 10,308,381 B2 | | 6/2019 | Guggisberg et al. | |
| 2009/0188214 A1 | * | 7/2009 | Vohnout-Marle | G07D 11/12 |
| | | | | 53/492 |
| 2009/0297324 A1 | | 12/2009 | Jaeger | |
| 2011/0048890 A1 | | 3/2011 | Billet et al. | |
| 2012/0175217 A1 | * | 7/2012 | Demmeler | B65H 1/027 |
| | | | | 194/206 |
| 2014/0331618 A1 | | 11/2014 | Guggisberg et al. | |
| 2016/0086415 A1 | | 3/2016 | Razzaboni et al. | |
| 2016/0189465 A1 | | 6/2016 | Neuhauser et al. | |
| 2016/0314638 A1 | | 10/2016 | Dopfer et al. | |

FOREIGN PATENT DOCUMENTS

| | | |
|---|---|---|
| CN | 104871219 A | 8/2015 |
| CN | 105264580 A | 1/2016 |
| CN | 105745691 A | 7/2016 |
| DE | 3806512 A1 | 9/1989 |
| DE | 102006019153 A1 | 10/2007 |
| DE | 102012022922 A1 | 5/2014 |
| EP | 0955259 A1 | 11/1999 |
| WO | 2010046007 A1 | 4/2010 |

OTHER PUBLICATIONS

Office Action from corresponding Chinese Application No. 201880043107.0, dated Mar. 17, 2021.

* cited by examiner

DEVICE AND METHOD FOR FILLING CONTAINERS WITH VALUE DOCUMENTS, IN PARTICULAR BANKNOTES, AND SYSTEM FOR PROCESSING VALUE DOCUMENTS

BACKGROUND

The invention relates to an apparatus and a method for filling containers with value documents, in particular banknotes, and to a system for processing value documents having such an apparatus.

In so-called cash centers, such as at cash-in-transit companies or central banks, in which a multiplicity of banknotes are checked, sorted, counted, commissioned and/or banded, the processed banknotes are often filled in containers provided for storage and/or transport purposes.

SUMMARY

It is an object of the present invention to make the filling of containers with value documents, in particular banknotes, more efficient, in particular free of interruptions.

The apparatus according to the invention for filling containers with value documents, in particular banknotes, has: a container receiving device which is adapted to receive a container stack which has two or several containers for receiving value documents, a lid receiving device which is adapted to receive a lid stack which has two or several lids for closing the containers, a container removal device which is adapted to remove a container, in particular the respectively lowermost container, from the container stack, a closing device and a transport device which is adapted to convey the container removed from the container stack to a filling station in which the container can be filled with value documents, and to convey the container filled with value documents to the closing device which is adapted to remove a lid, in particular the respectively lowermost lid, from the lid stack and to close the filled container with the removed lid. Alternatively, the containers and/or lids can also be removed in automated manner from the upper side of the respective stack, however which increases the mechanical complexity and is disadvantageous for the manual refilling of lids and/or containers.

The system for processing value documents according to the invention for processing, in particular sorting, counting and checking, value documents, in particular banknotes, has a value-document processing apparatus which is adapted to output processed value documents in at least one output pocket, an apparatus according to the invention for filling containers with value documents, and a filling device which is adapted to fill a container conveyed to the filling station of the apparatus with the value documents output in the at least one output pocket of the value-document processing apparatus. The value documents output in the output pocket of the value-document processing apparatus can be present there as loose value-document stacks or in the form of banded value document stacks and/or value document stacks wrapped with foil. Also for filling the containers in the apparatus, it is optionally possible to employ stacks of loose or banded value documents and/or value documents wrapped with foil. Preferably, when filling the containers, the value documents are arranged in the respective container in such a manner that one edge of the respective value document stands on the bottom of the container, i.e. the value documents are arranged upright in the container.

In the method according to the invention for filling containers with value documents, in particular banknotes, preferably the respectively lowermost container is removed from a container stack which has two or several containers for receiving value documents, and is conveyed to a filling station in which the container is filled with value documents. The container filled with value documents is conveyed further to a closing device, in which, from a lid stack having two or several lids for closing the containers, there is removed a lid, in particular the respectively lowermost lid of the lid stack, and the container filled with value documents is closed with the removed lid.

In the preferred embodiment, containers which can be filled with value documents and lids for closing these containers are provided respectively in a stack, and the lowermost container and/or the lowermost lid are removed from the stack in each case by a container removal device or closing device. The individual removed containers are initially conveyed by a transport device to a filling station for filling with value documents and from there to the closing device, where the filled containers are closed with the individually removed lids.

The container stack is received by a container receiving device and the lid stack is received by a lid receiving device. Preferably, both the container receiving device and the lid receiving device are adapted to be filled with further containers and/or lids manually or automatically, wherein containers and/or lids newly fed to the container receiving device and/or the lid receiving device are placed on the respective stack from above. This achieves that the container or lid removal can be effected according to the so-called first-in-first-out principle, and thus the removal of the containers and/or lids from below is not disturbed by adding new containers and/or lids to the respective stack from above. As a result, a refilling of containers and lids during the operation of the apparatus is made possible without having to interrupt the removal, the filling and closing of the containers.

Overall, the invention thus allows an efficient filling of containers with value documents, in particular banknotes.

In a preferred embodiment, the containers contained in the container stack received by the container receiving device and/or the lids contained in the lid stack received by the lid receiving device are stacked along a stacking direction which, particularly in the region of the container removal device and/or the closing device, is substantially perpendicular to a direction of movement of the container conveyed by the transport device, along which the container is transported through the apparatus. The direction of movement is preferably substantially horizontal and the stacking direction of the containers and/or lids is substantially vertical. As a result, additional containers or lids can be simply fed to the corresponding stack from above, while the stack, after removal of the respectively lowermost container or lid, can slide downward, for example by gravity.

For example, the container removal device is adapted such that the container removed from the container stack is fed to the transport device by gravity. Alternatively or additionally, the closing device is adapted such that the lid removed from the lid stack is deposited on the filled container by gravity. As a result, the container can be fed reliably to the transport device in a simple manner and/or the lid can be deposited reliably on the filled container in a simple manner, in particular without the need for additional and possibly wear-prone or error-prone mechanical apparatus. In addition, thus the feeding of the container and/or the depositing of the lid can be carried out automatically and free of interruptions. Alternatively, the container removal device can also be adapted such that the container removed from the container stack is deposited on the transport device with the aid of a lifting element.

In order to make the feeding of the container and/or the depositing of the lid even more reliable, the container removal device and/or the closing device can have one or several guide elements which extend in particular substantially along the stacking direction and which are adapted to guide the removed container and/or lid, which is falling or sliding downward due to gravity, towards the transport device or towards the filled container.

In a further preferred embodiment, the closing device has a first pusher element which is adapted to displace a lid deposited on the filled container relative to the container, in particular parallel to the upper side of the container, from a position in which the lid is placed on the container but still is not lockable into a closing position in which the container is lockable with the lid. In this case, the container and/or the lid are adapted to make possible the displacement of the lid relative to the container only in a predetermined direction, in particular in the direction parallel to the upper side of the container, so that the lid can be reliably transferred into the closing position. For this purpose, the lids and/or containers can have one or several guides, for example, which in particular extend parallel to the upper side of the container, such as grooves or slots in which a part of the container and/or lid can engage. The first pusher element is preferably configured as an eccentrically rotating pusher element, in particular as an eccentrically mounted roller, and is adapted, while rotating about an axis substantially perpendicular to a direction defined by the displacement of the lid relative to the container, to enter into contact with the lid at a circumferential side surface of the pusher element and to displace the lid into the closing position by the rotation. In these embodiments, a particularly reliable and time-saving closing of the filled container with the lid is made possible.

In a further preferred embodiment, the closing device has a second pusher element which is adapted to lock the lid arranged on the filled container in the closing position by actuation of a closing element located on the lid. The closing element of the lid, which is preferably fixated to the lid or integrated in the same, can be a closing latch, in particular a rotary latch. The second pusher element of the closing device can be adapted to lock the container by turning the rotary latch located on the lid. The second pusher element can be configured as a rotatable pusher element which has an actuation projection extending perpendicular to the axis of rotation of the pusher element, which actuation projection is adapted to interact with the closing latch on the lid, for example the rotary latch, upon rotation of the pusher element. This also makes it possible to close the filled container with the lid in particularly reliable and time-saving manner.

In a further preferred embodiment, the closing device has a first support element and a second support element which are arranged on mutually opposite sides of the lid located in the lid stack and are adapted to be brought from a starting position of the support elements, in which the support elements are retracted from the lid stack, into a support position, in which the first and the second support element support the lid stack received by the lid receiving device against gravity. Further, the closing device preferably has a first singling element and a second singling element which are arranged on mutually opposite sides of the lid located in the lid stack and are adapted to be brought from a starting position of the singling elements, in which the singling elements are retracted from the lid stack, into a singling position, in which the first and the second singling element support the lids stacked above the lowermost lid against gravity. The closing device is in particular adapted to move the first and the second support element from the respective support position into the respective starting position upon removal of the lowermost lid from the lid stack and, preferably simultaneously, to move the first and the second singling element from the respective starting position into the respective singling position. In this case, the first and the second singling element preferably push between the lowermost lid of the lid stack and the next lids disposed thereabove. As a result, the lowermost lid of the lid stack can be removed easily and quickly with very little mechanical effort.

In a further preferred embodiment, the first support element is mechanically coupled to the first singling element and the second support element is mechanically coupled to the second singling element in such a manner that, when the first and the second support element are withdrawn from the support position for removing the respectively lowermost lid from the lid stack, the first and the second singling element are simultaneously brought into the singling position due to the mechanical coupling. Preferably, the mechanical coupling acts as a lever and reliably prevents the simultaneous removal of more than one lid from the lid stack. In particular, the risk of a malfunction of the closing device can be minimized by the mechanical coupling, in which the lid stack would no longer be held in the lid receiving device and the filling of the containers would be interrupted.

In a further preferred embodiment, the transport device has a transport element for conveying the container and at least one lifting element for vertically moving the respective container, wherein the lifting element is arranged, for example, in the region of the container removal device and/or in the region of the filling station and/or in the region of the closing device and is adapted to feed the container removed from the container stack to the transport element and lift said container upwards from the transport element and/or deposit the respective container on the transport element from above. For example, a lifting element is arranged in the region of the filling station and is adapted to lift the respective container in the region of the filling station upwards from the transport element and to position it by the lifting such that value documents can be inserted in the respective container from above with the aid of a filling device. Alternatively or additionally, a lifting element is arranged in the region of the closing device and is adapted to lift the respective container in the region of the closing device upwards from the transport element and to position it by the lifting such that the closing device can close it with a lid. Alternatively or additionally, a lifting element is arranged in the region of the container removal device and is adapted to support the respectively lowermost container in the stack at the time when it is removed from the container stack, to lower the removed container and to deposit it on the transport element by the lowering. The transport element is preferably configured as a transport belt and/or has a multiplicity of transport rollers. The lifting element can be configured, for example, as a hydraulically, pneumatically or electromechanically actuated lifting table.

Preferably, the at least one lifting element is adapted to lift the container in the region of the filling station in such a manner that the container is guided by one or several positioning elements of the filling station and is positioned, in particular aligned, in a filling position. As a result, the container located in a defined position in the filling station can be filled particularly reliably with value documents, wherein the risk of a malfunction, which would interrupt the filling of the container, can be reduced.

Preferably, the closing device also has one or several positioning elements, which are adapted to position, in particular to align, the filled container in a lid receiving position upon lifting by the at least one lifting element. As a result, the lid can be reliably and precisely deposited on the filled container, displaced into the closing position and/or the closing element located on the lid can be actuated, wherein the risk of a malfunction, which would interrupt the filling of containers, can be reduced.

In a further preferred embodiment, the apparatus has an output device which is adapted to arrange the container filled with value documents and closed with the lid to be lowermost in a container output stack (at the lowermost position of the container output stack), wherein the transport device is adapted to convey the filled and closed container from the closing device to the output device. As a result, the filled and closed containers are reliably stacked according to the first-in-first-out principle and supplied for further processing, for example for transport. For example, the containers filled with value documents can be removed manually from the container output stack. However, the output device can also be adapted to remove the filled containers from the container output stack in automated manner and, for example, supply them for manual or automatic transporting away.

In a further preferred embodiment, the apparatus has a container transport device that can be approached, in particular docked, to the apparatus, in particular a transport carriage which is adapted to receive the container output stack. The output device is adapted to output or forward the containers filled with value documents and closed with the lid individually one after the other to the approached or docked container transport device. Preferably, the container transport device, in particular the transport carriage, is adapted to receive several container output stacks next to each other. As a result, the value documents arranged in the containers can be easily transported and/or stored.

The container transport device preferably has at least one stack guide for receiving containers stacked in container output stacks, which are filled with value documents and closed with a lid. Preferably, the container transport device in the region below the at least one stack guide is configured to be open in such a manner that it makes possible approaching the container transport device to the apparatus in such a manner that the containers can be transported with the aid of transport elements of the apparatus into the region below the at least one stack guide and can be pushed from below into the at least one stack guide with the aid of lifting elements of the apparatus.

In a further preferred embodiment, the apparatus has a control device which is adapted to link identification data of the value documents, with which the container has been filled by the filling station, with identification data of the container in a database. The identification data of the value documents are transmitted to the control device by the value-document processing apparatus, for example, from whose deposit pocket the value documents are removed and which has processed, in particular checked, the value documents prior to their being deposited in the container. The identification data of the container can be printed on the container in machine-readable manner, for example, such as in the form of a number sequence or bar code, or can be stored on a wirelessly readable transponder, for example an RFID tag. For this purpose, the apparatus preferably has a reading device which is adapted to detect the identification data of the container and which is arranged in the region of the container removal device, the filling station or the closing device. As a result, the value documents with which the containers are filled can be identified and/or tracked easily and reliably, in particular at a later time, for example in a storage.

In a further preferred embodiment, the apparatus has a filling device which has a gripping device and is adapted to grip a stack of value documents with the gripping device and deposit it in the container conveyed to the filling station.

In a preferred embodiment of the system for processing value documents, the filling device has a gripping device and is adapted to grip a stack of value documents output in the at least one output pocket with the gripping device and deposit it in the container conveyed to the filling station, wherein the value documents in the value document stack can be loose or banded and/or wrapped with foil.

In both embodiments of the apparatus or the system for processing value documents described above, the filling device is preferably configured as a robot or as a robot arm. In both embodiments, the container can be filled quickly and precisely with value documents which are output by the value-document processing apparatus, for example, in a loose stack, banded or packaged.

BRIEF DESCRIPTION OF THE DRAWINGS

Further advantages, features and application possibilities of the present invention will result from the following description in connection with the figures. There are shown.

DETAILED DESCRIPTION OF VARIOUS EMBODIMENTS

Figure 1:
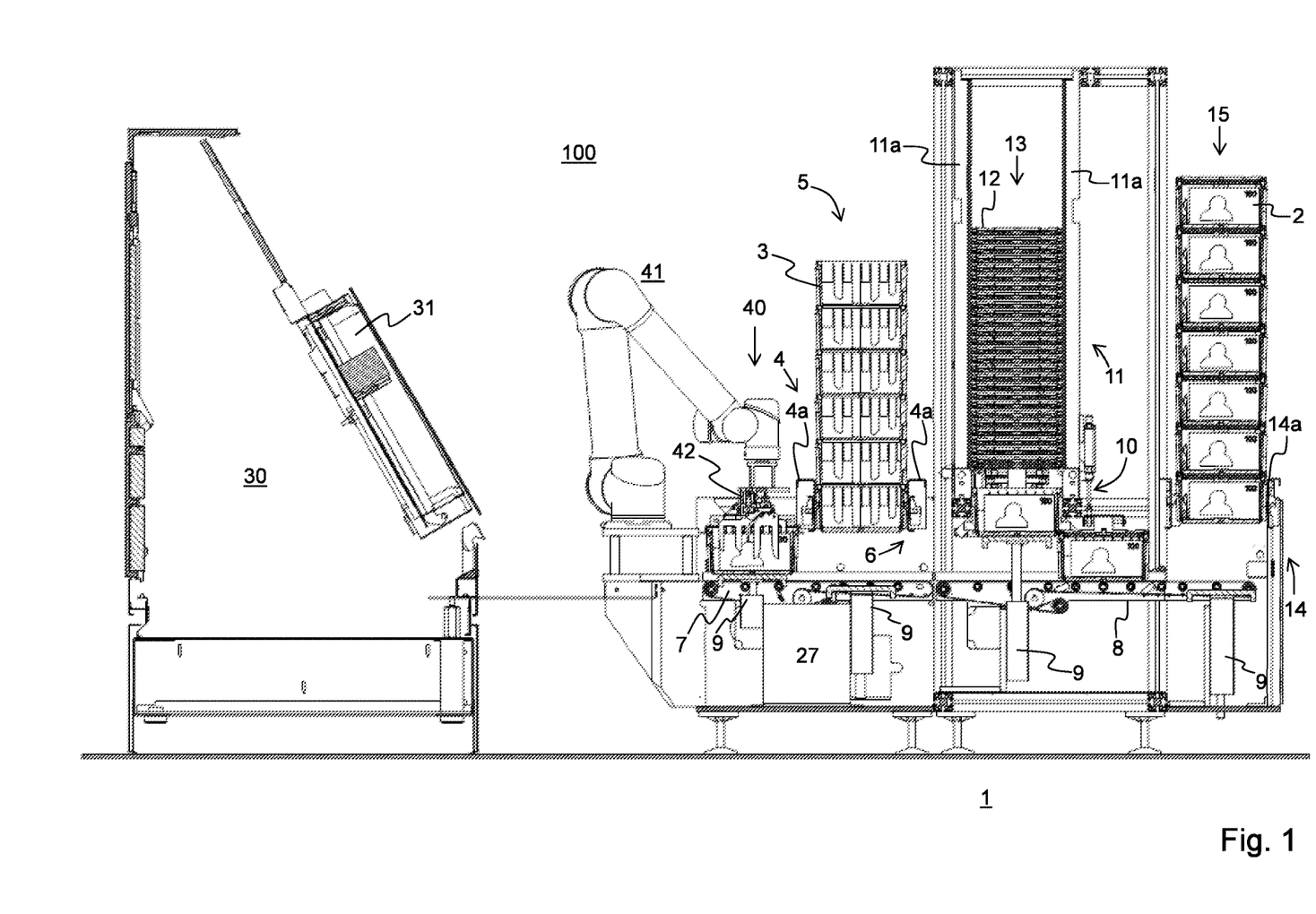
FIG. 1 an example of a system for processing value documents with an apparatus for filling containers.

FIG. 1 shows an example of a system 100 for processing, in particular for sorting, counting and/or checking, value documents 2, in particular banknotes. The system has a value-document processing apparatus 30, an apparatus 1 for filling containers 3 with value documents 2 and a filling device 41.

In the apparatus 1, individual containers 3 are supplied at a filling station 40, where they can be filled with the aid of the filling device 41 with value documents 2 processed by the value-document processing apparatus 30. The filled containers are then closed with a lid and finally output. This will be explained in more detail below.

In particular, the apparatus 1 has a container receiving device 4 which is adapted to receive a container stack 5. The containers 3 are preferably configured, in particular shaped, such that they can be stacked one above the other. For example, the containers can have shapes, such as ribs, on their lower side, which engage in corresponding recesses on the upper side or opening of the containers 3 during the stacking, so that the container stack 5 stands steadily and the containers 3 are aligned relative to one another in the container stack 5.

In the example shown, the container receiving device 4 is formed by container guides 4a which guide and support or hold the respectively lowermost container 3 of the container stack 5. Thus, further containers 3 can be added to the container stack 5 by a user, in particular also during the operation of the apparatus 1, by simply placing these on the upper end of the container stack 5.

In the region of the container guides 4a, a container removal device 6 is arranged which is adapted to remove the respectively lowermost container 3 of the container stack 5 from the stack. The container removal device 6 can have, for example, holding elements which support the lowermost container 3 of the stack against gravity. When the lowermost container 3 is removed from the container stack 5, the holding elements are pivoted such that the lowermost container 3 is released and can slide out of the container receiving device 4 and/or can be lowered downward with the aid of a lifting element 9.

The apparatus 1 further has a transport device 7, which comprises a transport element 8 and several lifting elements 9 and is adapted to convey the container 3 removed from the container stack 5 to the filling station 40. In the example shown, the transport element 8 is formed by several transport belts, on which the containers 3 are deposited and can be moved from the container removal device 6 to the right and the left in a substantially horizontal direction. The lifting elements 9 are preferably configured as hydraulically, pneumatically or electromechanically actuatable lifting tables, which can raise the containers 3 from the transport element 8 and/or deposit them thereon.

For example, the container 3 conveyed from the container removal device 6 to the filling station 40 is lifted off the transport element 8 by a lifting element 9 and thereby positioned in a filling position by positioning elements of the filling device 41, such as guide rails.

The filling device 41 can be configured, for example, as a robot or robot arm and preferably has a gripping device 42 which is adapted to grip several value documents 2, in particular a stack of loose or banded and/or foil-wrapped value documents 2. With the aid of the gripping device 42, the processed value documents 2 output in an output pocket 31 of the value-document processing apparatus 30 are removed from the output pocket 31 and inserted or put in the container 3 positioned in the filling position. As soon as the container is completely or partially filled with value documents, the filled container 3 is set down again on the transport element 8 by the lifting element 9 and is conveyed by the latter to a closing device 10.

The closing device 10 is arranged in the region of a lid receiving device 11 of the apparatus 1 and is adapted to remove the respectively lowermost lid 12 from a lid stack 13, which has been received by the lid receiving device 11, and to close the filled container 3 therewith. This will be explained in more detail below in connection with FIGS. 2(a) to 2(c).

In the present example, the lid receiving device 11 has lid aligning elements 11a which are adapted to align the lids 12 in the lid stack 13 relative to one another and to guide these downwardly to the closing device 10 when they slide down by means of gravity. A user can add further lids 12 to the lid stack 13 at any time, in particular also during the operation of apparatus 1, simply by introducing them at the upper end of the lid receiving device 11 and/or placing them on the upper end of lid stack 13.

The covers 12 are preferably configured, in particular shaped, in such a manner that they can be stably and precisely stacked one above the other. For example, the lids 12 have mutually matched projections or recesses on their upper side and lower side, such as in the form of ribs, which are engaged with each other during the stacking and make possible space-saving stacking, in which only about 10 mm stack height are occupied by a lid 12, and make possible a predetermined mutual alignment of the lids 12. When a lid is contained in the lid stack in the wrong orientation, this is immediately noticeable to an operator, since the lid stack is then displaced in this place and the stack is less stable.

Figure 4:
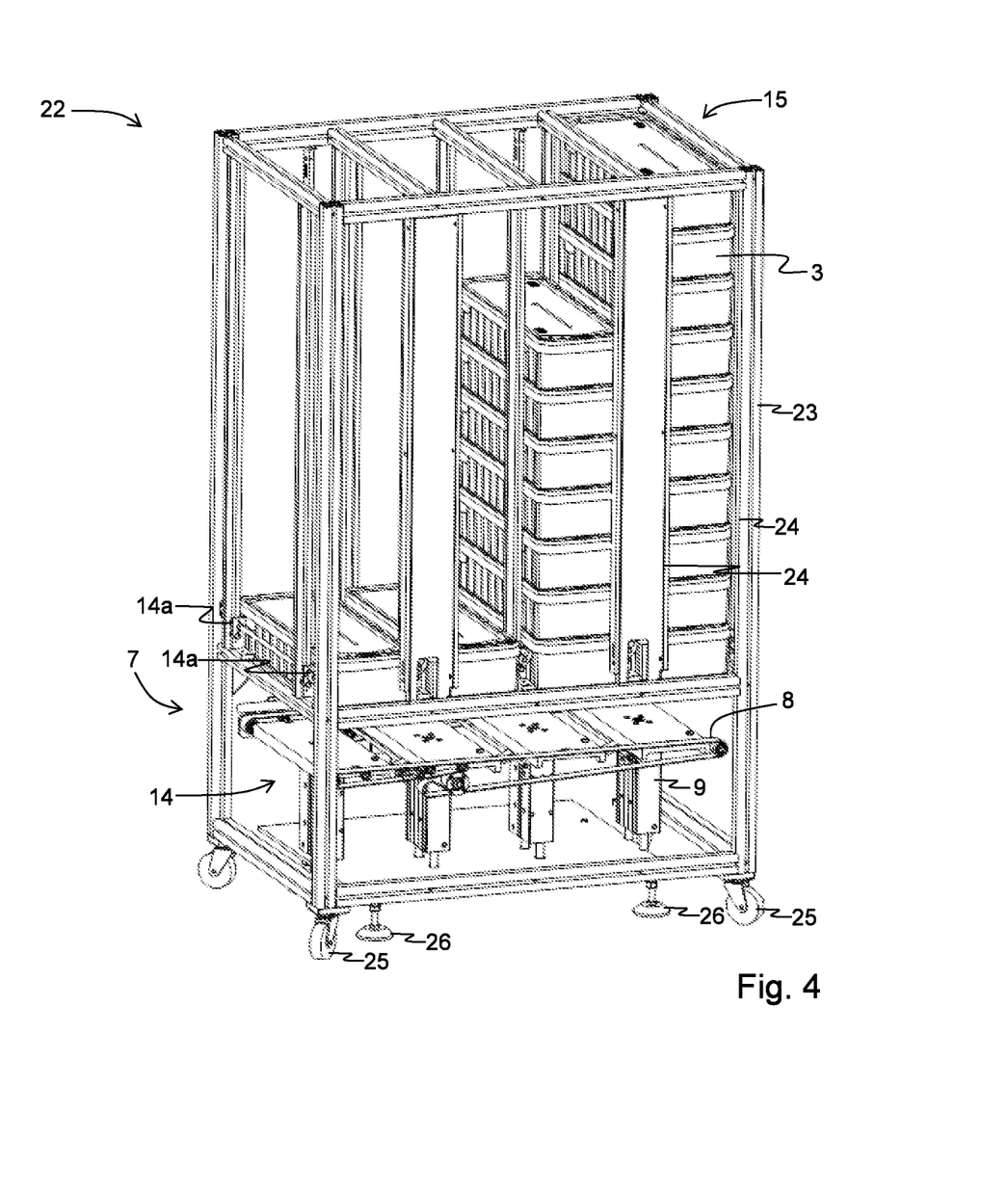
FIG. 4 an example of a container transport device.

The filled and closed containers 3 are conveyed by the transport element 8 further to an output device 14 which is adapted to output the containers 3 in a container output stack 15. The output device 14 preferably has detent elements 14a, which support the container 3 lifted upwards from the transport element 8 by a lifting element 9 against gravity, so that the container 3 remains in the output device 14 when the lifting element 9 is returned downward, back to the transport element 8. The detent elements 14a are adapted such that a container 3 which comes to the container output stack 15 can be pushed bottom-up through the detent elements 14a, but the container output stack 15 arranged thereabove it is supported against gravity by the detent elements 14a. For each container output stack 15 at least two detent elements 14a, for example four detent elements 14a, are present on mutually opposite sides of the container output stack 15. An example of such detent elements 14a is shown in FIG. 4.

In this manner, the output device 14 can add more filled and closed containers 3 to the container output stack 15 from below, so that the containers 3 and/or the value documents 2 contained in them can be removed from the upper end of the container output stack 15 in the order of processing by the value-document processing apparatus 30.

The apparatus 1 preferably has a control device 27 which is adapted to link identification data of the value documents 2, which were processed by the value-document processing apparatus 30 and filled into the containers 3 at the filling station 40, with identification data of the respective containers 3 in a database (not shown). For this purpose, the control device 27 is connected to the value-document processing apparatus 30 via a suitable data connection (wireless or wired), via which the identification data, for example serial numbers or an identification of the depositor of the respective value document stack or the of deposit of the respective value document stack, of the value documents 2 output in the output pocket 31 are transmitted to the control device 27. The identification data of the containers 3, for example identification numbers, can be detected by sensor, for example when removing the respectively lowermost container 3 from the container stack 5 at the container removal device 4 or when positioning the containers 3 in the filling position at the filling station 40, for example by reading a bar code or RFID tag attached to the containers 3 by means of a reading device which is connected to the control device 27.

The database can preferably be part of a cash center, so that certain value documents 2, for example the value documents belonging to a particular deposit, can be easily determined and/or found via the allocation to the respective container 3. Alternatively or additionally, the identification data of the value documents 2 can also be stored by a readable and writable chip which is attached to the respective container 3.

Figures 2A, 2B, 2C:
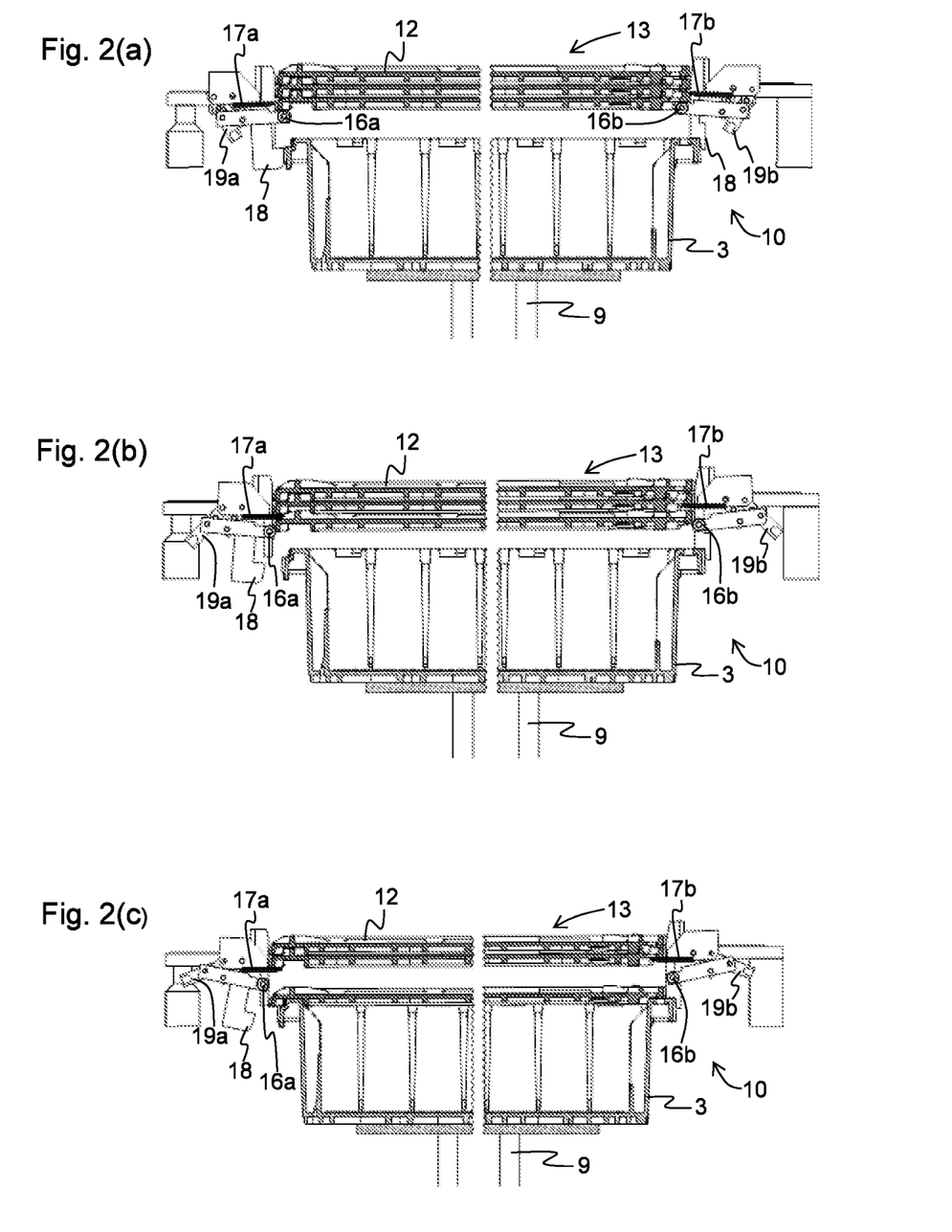
FIGS. 2(a) to 2(c) examples for illustrating the removal of a lid from a lid stack.

FIGS. 2(a) to 2(c) show an example for illustrating the removal of the respectively lowermost lid 12 from a lid stack 13 in the closing device 10, which has a first support element 16a and a second support element 16b as well as a first singling element 17a and a second singling element 17b. When the lowermost lid 12 is removed from the lid stack 13 the container 3 filled with value documents is brought into a lid receiving position by a lifting element 9. Positioning elements 18 of the closing device 10 make possible an accurate positioning or alignment of the filled container 3 under the lid stack 13 and/or the closing device 10.

It is represented in FIG. 2(a) how the lowermost lid 12 of the lid stack 13 and thus also the entire lid stack 13 are supported against gravity by the first and second support elements 16a, 16b in a support position.

For removing the lowermost lid 12, the first and second support elements 16a, 16b are brought out of the support position and at the same time the first and second singling elements 17a, 17b are brought into a singling position, i.e. are pushed between the lowermost lid 12 of the lid stack 13 and the lid 12 disposed thereabove. This is represented in FIG. 2(b). The movements of the support elements 16a, 16b out of the support position and the movements of the singling elements 17a, 17b into the singling position are preferably carried out synchronously. For this purpose, in the example shown, the first support element 16a is mechanically coupled to the first singling element 17a via a first coupling element 19a. Analogously, the second support element 16b is mechanically coupled to the second singling element 17b via a second coupling element 19b. By pivoting the coupling elements 19a, 19b, the support elements 16a, 16b and the singling elements 17a, 17b can thus be moved in opposite directions.

In FIG. 2(c), the support elements 16a, 16b have released the lowermost lid 12 of the lid stack 13 so that the lowermost lid 12 can fall by gravity, typically about 20 mm to 30 mm deep, onto the filled container 3 positioned in the lid receiving position. The falling lid 12 can be guided by corresponding lid guides (not shown).

Figure 3A:
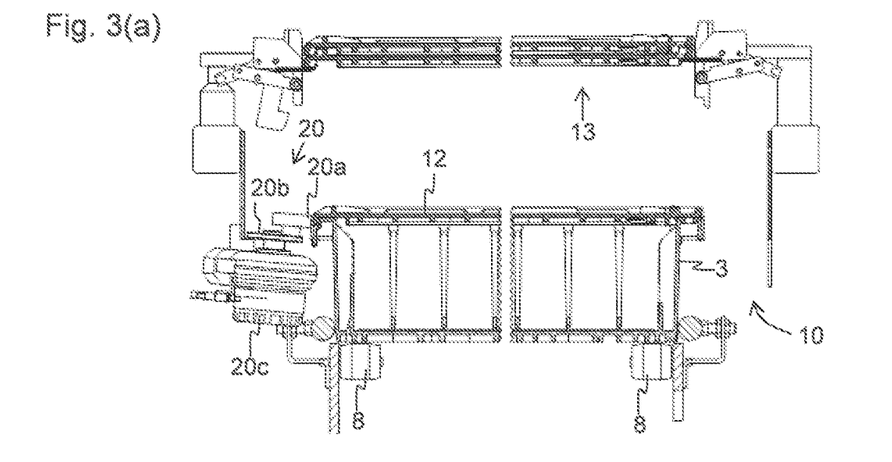
FIGS. 3(a) and 3(b) examples of a closing device.
Figure 3B:
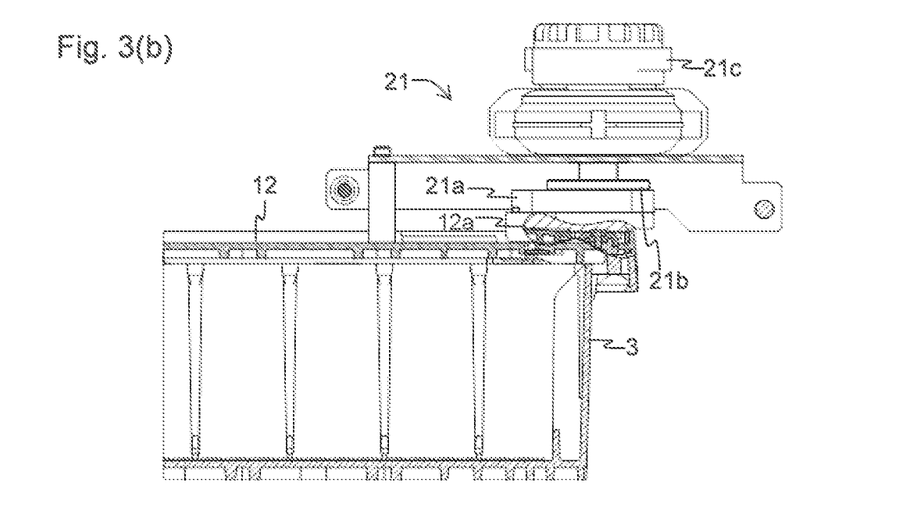

FIGS. 3(a) and 3(b) show an example for illustrating the closing of a container 3 filled with value documents with a lid 12 by the closing device 10.

As represented in FIG. 3(a), the filled container 3 was transferred from the lid receiving position back to the transport element 8 by a lifting element (cf. FIG. 1) after the lid 12 was deposited on the filled container 3.

The closing device 10 has, in the example shown, a first pusher element 20 which is adapted to displace the lid 12, for example horizontally, into a closing position. In the closing position, the lid 12 is preferably laterally flush with the container 3.

The first pusher element 20 for this purpose has an eccentrically mounted contact roller 20a, which is fastened eccentrically offset on a first disk-shaped base plate 20b. Upon a rotation of the first base plate 20b driven by a first pneumatic rotary cylinder 20c, the circumferential surface of the contact roller 20a interacts with the lid 12 and displaces the same relative to the container 3 into the closing position (to the right in FIG. 3(a)).

In FIG. 3b, a second pusher element 21 of the closing device 10 is shown which is adapted to lock the container 3 with the lid 12 by means of a closing element arranged on the lid 12, for example a closing latch or a rotary latch 12a. Here, a second pneumatic rotary cylinder 21c rotates a second disk-shaped base plate 21b on which an actuating projection 21a is fastened. Preferably, by a rotation of the base plate 21b, the actuating projection 21a is brought into interaction with the closing element and actuates the same to lock the lid 12 firmly with the container 3.

FIG. 4 shows an example of a container transport device 22, which can preferably be used together with the apparatus 1 described above in connection with FIG. 1. The container transport device 22 in the example shown is configured as a transport carriage and has a frame 23 in which several stack guides 24 are arranged for receiving containers 3 stacked in container output stacks 15, said containers 3 being filled with value documents and closed with a lid.

In order to support the respectively lowermost container 3 of an output stack 15 and thus the entire output stack 15 against gravity, the stack guides 24 preferably have detent elements 14a which allow a feeding of a further container 3 to the respective output stack 15 from below, but prevent a sliding driven by gravity of the respectively lowermost container 3 of the output stack 15 out of the output stack 15.

The container transport device 22 can be approached to the apparatus 1 and possibly docked, wherein it is positioned in the region of the output device 14 of the apparatus 1, for example with the aid of corresponding guides or docking elements. A specific relative position is thus ensured between the container transport device and the apparatus, in which containers 3 (filled and closed with a lid) can be forwarded individually one after the other from the transport device 7 of the apparatus 1 to the container transport device 22. To be able to feed further filled containers from below to the container output stacks 15 located in the container transport device 22, the container transport device 22 is preferably adapted to be positioned in such a manner in the region of a part of the transport device 7 of the apparatus 1, in particular on a transport belt 8 and several lifting elements 9 of the apparatus 1 (cf. FIG. 1), that the output stacks 15 of the container transport device 22 are each arranged above a lifting element 9 of the transport device 7 belonging to the apparatus 1. It is advantageous that the actuators (for example cylinders, lifters, etc.) required for the forwarding of the containers 3 form part of the apparatus 1, and the container transport device 22 itself needs no actuators or transport means for transporting the containers 3. Therefore, a simple and cost-effective container transport device 22 can be employed.

Alternatively, the transport element and the lifting elements located below the container output stacks 15 in FIG. 4 can also be parts of the container transport device 22, and the container transport device 22 can be positioned on the transport element 8 of the apparatus 1 such that the filled containers can be forwarded from the transport element 8 of the apparatus 1 to the transport element of the container transport device 22. In this case, an output device 14 can be dispensed with in the apparatus 1.

For the purpose of positioning, the container transport device 22 has several wheels 25, for example so-called Castor wheels, by which the container transport device 22 can be easily maneuvered and positioned on the apparatus 1. In the example shown support legs 26 are further provided by which the transport device 7 of the apparatus is fixed spatially.

The container transport device 22 can be manually movable. However, it can also be configured as a transport vehicle, in particular a driverless transport vehicle (AGV), or can be adapted to be moved by a transport vehicle, in particular by a driverless transport vehicle (AGV).

The invention claimed is:

1. An apparatus for filling containers with value documents, comprising:
   a container receiving device which is adapted to receive a container stack which has two or more containers for receiving value documents;
   a lid receiving device which is adapted to receive a lid stack which has two or more lids for closing the containers;
   a container removal device which is adapted to remove a container from the container stack received by the container receiving device;
   a closing device for closing the respective container with a lid;

a transport device which is adapted to convey the container removed from the container stack to a filling station, in which the container can be filled with value documents, and to convey the container filled with value documents to the closing device which is adapted to remove a lid from the lid stack and to close the container filled with value documents with the lid; and
an output device;
wherein the transport device is configured to convey the container filled with value documents and closed with the respective lid from the closing device to the output device;
wherein the container receiving device comprises a container support surface for contacting a respectively lowermost container of the container stack;
wherein the lid receiving device comprises a lid support surface for contacting a respectively lowermost lid of the lid stack;
wherein the transport device comprises a movable surface for conveying the container removed from the container stack to the filling station; and
wherein the output device comprises a container output surface for contacting a respectively lowermost container of a container output stack.

2. The apparatus according to claim 1, wherein the closing device is adapted to remove a lowermost lid from the lid stack and to close the container filled with value documents with the lid removed from the lid stack;
wherein the closing device is adapted in such a manner that the lowermost lid removed from the lid stack is deposited on the filled container by gravity.

3. The apparatus according to claim 1, wherein the closing device has a first pusher element which is adapted to displace a lid deposited on the filled container relative to the container, parallel to an upper side of the container, into a closing position, in which the container is lockable with the lid; and
wherein the closing device preferably has a second pusher element which is adapted to lock the lid arranged on the filled container in the closing position by actuation of a closing element located on the lid, by turning a rotary latch contained in a respective lid.

4. The apparatus according to claim 3, wherein the first pusher element comprises a movable actuating surface; and
wherein the second pusher element comprises an actuating projection.

5. The apparatus according to claim 1, wherein the closing device has a first support element and a second support element which are arranged on mutually opposite sides of lids located in the lid stack and which are adapted to be brought from a starting position of the first and second support elements, in which the first and second support elements are retracted from the lid stack, into a support position, in which the first and second support elements support the lid stack received by the lid receiving device against gravity.

6. The apparatus according to claim 5, wherein the closing device has a first singling element and a second singling element which are arranged on mutually opposite sides of the lids located in the lid stack and which are adapted to be brought from a starting position of the first and second singling elements, in which the first and second singling elements are retracted from the lid stack, into a singling position, in which the first and second singling elements support the lids stacked above the lowermost lid against gravity.

7. The apparatus according to claim 6, wherein the first support element and the second support element each comprise lid guide surface for guiding a respectively lowermost lid of the lid stack; and
wherein the first singling element and the second singling element each comprise a singling projection for contacting the lid stack.

8. The apparatus according to claim 1, wherein the transport device has a transport element for conveying the container and at least one lifting element for vertically moving the container respectively, which is arranged in a region of the container removal device and/or in the region of the filling station and/or in the region of the closing device and is adapted to feed the container removed from the container stack to the transport element, to lift the respective container from the transport element upwards and/or deposit the respective container on the transport element from above.

9. The apparatus according to claim 8, wherein the at least one lifting element comprises a lifting surface movable between an upwards position and a downwards position.

10. The apparatus according to claim 1, wherein the output device is configured to arrange the container filled with value documents and closed with the lid to be lowermost in the container output stack.

11. The apparatus according to claim 1, with a container transport device which is adapted to receive the container output stack;
wherein the output device and the container transport device can be positioned relative to one another in such a manner and are adapted such that the containers filled with value documents and closed with the lid can be output by the output device to the container transport device.

12. The apparatus according to claim 1, with a filling device, which has a gripping device and is adapted to grip a stack of value documents with the gripping device and to deposit the value documents in the container conveyed to the filling station.

13. A system for processing value documents for processing, sorting, counting and/or checking, value documents, comprising:
a value-document processing apparatus which is adapted to output processed value documents in at least one output pocket;
an apparatus for filling containers with value documents according claim 1; and
a filling device which is adapted to fill a container conveyed to the filling station of the apparatus with the value documents output in the at least one output pocket of the value-document processing apparatus.

14. The system for processing value documents according to claim 13, wherein the filling device has a gripping device and is adapted to grip a stack of value documents output in the at least one output pocket with the gripping device and to deposit the value documents in the container conveyed to the filling station.

15. The apparatus according to claim 1, wherein a transport carriage is configured to dock to the transport device.

16. The apparatus according to claim 1, wherein the transport device comprises a common conveyor;
wherein the container receiving device is positioned at a first end of the common conveyor, the output device is positioned at a second end of the common conveyor opposite the first end, and the lid receiving device is positioned between the container receiving device and the container removal device;

wherein each of the container receiving device, the lid receiving device and the output device are located above and operatively associated with said common conveyor.

17. The apparatus according to claim 1,
wherein the container removal device comprises a container guide surface for guiding a respectively lowermost container of the container stack during removal of said container from the container stack; and
wherein the closing device comprises a lid guide surface for guiding a respectively lowermost lid of the lid stack.

18. A method for filling containers with value documents with steps of:
conveying a container by a transport device from a container receiving device comprising a container support surface for contacting a respectively lowermost container of a container stack to a filling station, in which the container is filled with value documents;
conveying the container filled with value documents to a closing device, in which, from a lid receiving device comprising a lid support surface for contacting a respectively lowermost lid of a lid stack having two or several lids for closing the containers, there is removed one of the lids, and in which the container filled with value documents is closed with the lid; and
conveying the container filled with value documents and closed with the lid from the closing device to an output device;
wherein the output device comprises a container output surface for contacting a respectively lowermost container of a container output stack;
wherein the transport device comprises a movable surface for conveying the container from the container stack to the filling station.

19. The method according to claim 18, comprising displacing the lid deposited on the filled container into a closing position, and
locking the container by actuation of a closing latch located on the lid.

20. An apparatus for filling containers with value documents, comprising:
a container receiving device which is adapted to receive a container stack which has two or more containers for receiving value documents;
a lid receiving device which is adapted to receive a lid stack which has two or more lids for closing the containers;
a container removal device which is adapted to remove a container from the container stack received by the container receiving device;
a closing device for closing the respective container with a lid;
a transport device which is adapted to convey the container removed from the container stack to a filling station, in which the container can be filled with value documents, and to convey the container filled with value documents to the closing device which is adapted to remove a lid from the lid stack and to close the container filled with value documents with the lid; and
an output device;
wherein the transport device is configured to convey the container filled with value documents and closed with the respective lid from the closing device to the output device;
wherein the transport device has a transport element for conveying the container and at least one lifting element for vertically moving the container respectively, which is arranged in a region of the container removal device and/or in the region of the filling station and/or in the region of the closing device and is adapted to feed the container removed from the container stack to the transport element, to lift the respective container from the transport element upwards and/or deposit the respective container on the transport element from above;
wherein the at least one lifting element comprises a lifting surface movable between an upwards position and a downwards position.

* * * * *